Dec. 1, 1936.  F. C. STANLEY  2,062,480
REENFORCED TOOTHED FRICTION DISK
Filed March 17, 1933
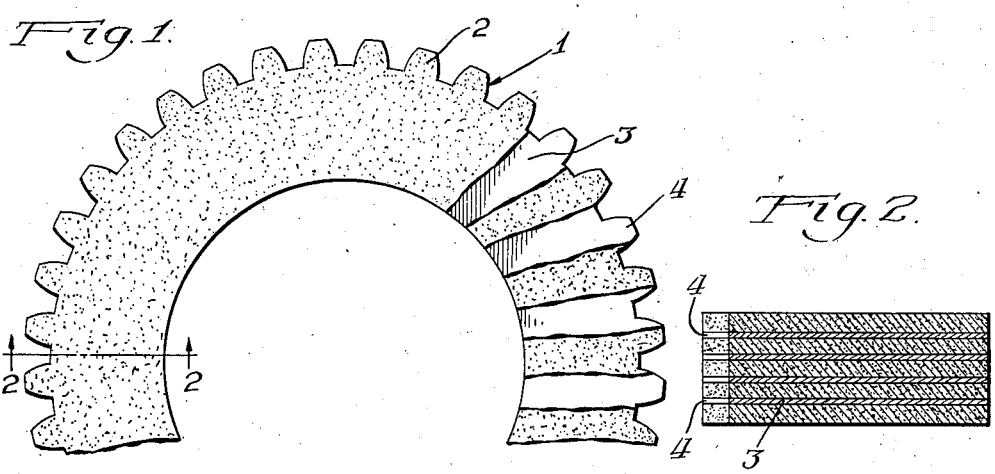
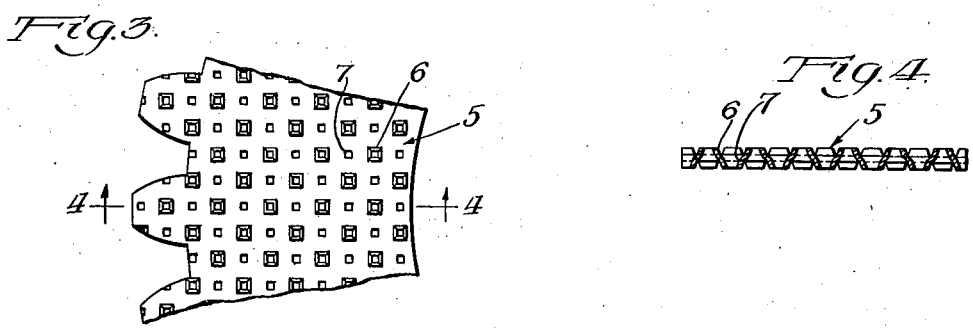
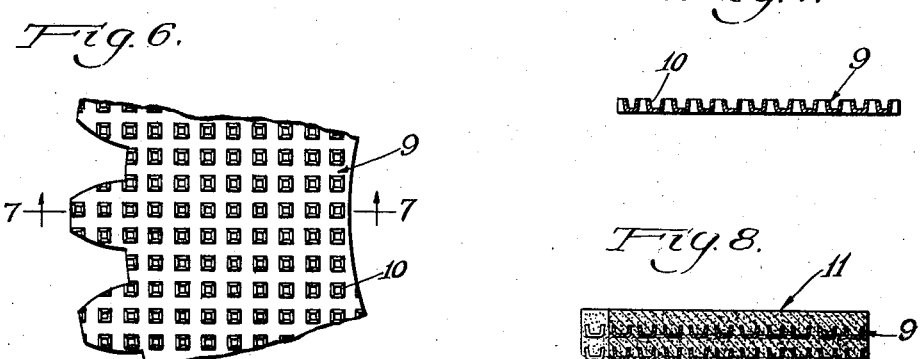
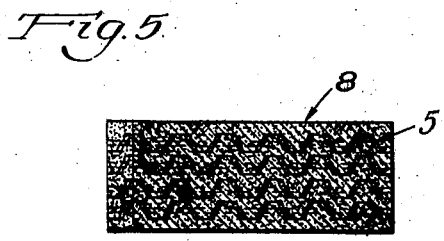
Inventor:
Frederick C. Stanley,
By Frank L. Belknap
Attorney Patented Dec. 1, 1936

2,062,480

UNITED STATES PATENT OFFICE 2,062,480

REENFORCED TOOTHED FRICTION DISK

Frederick C. Stanley, Bridgeport, Conn., assignor to Raybestos-Manhattan, Inc., Bridgeport, Conn., a corporation of New Jersey Application March 17, 1933, Serial No. 661,260

3 Claims. (Cl. 192—107)

This invention relates to improvements in non-metallic friction elements having metal reenforcement and refers specifically to a non-metallic friction element having integrally formed teeth, the element per se and the integral teeth being reenforced by metal members positioned intermediate the thickness of the friction element.

In the use of fiber clutch disks, such as those shown in the United States patent to M. F. Judd, No. 1,536,588, the teeth when subjected to heavy loads or abnormal stresses tend to chip, shear or otherwise collapse. To obviate this disadvantageous feature and still retain the advantages inherent in the use of a fiber clutch disk having integral teeth, is an object of the present invention.

To accomplish this purpose I propose to embed a metal reenforcing plate or plates in the body of the disk including the toothed portion thereof whereby the brunt of shocks, impacts and abnormal stresses is principally borne by the reenforcing plate or plates projecting into the teeth. The plate or plates may take the form of flat surfaces or said plates may be provided with projections or protuberances which may extend from one or both surfaces of the plates, the protuberances being adapted to intermesh or intertwine with the fibers constituting the disk proper to bind the whole as an integral structure.

Other objects and advantages of my invention will be apparent from the accompanying drawing and following detail description.

In the drawing, Fig. 1 is a fragmentary face view, parts being broken away, of a friction disk constructed in accordance with the concepts of my invention.

Fig. 2 is a sectional view taken on line 2—2 of Fig. 1.

Fig. 3 is a fragmentary enlarged face view of a reenforcing plate of double perforated construction.

Fig. 4 is a sectional view on the line 4—4 of Fig. 3.

Fig. 5 is a cross sectional view similar to Fig. 2, illustrating a double perforated reenforcing plate imbedded in a non-metallic friction disk.

Fig. 6 is a fragmentary enlarged face view of a reenforcing plate of single perforated form.

Fig. 7 is a sectional view taken on line 7—7 of Fig. 6.

Fig. 8 is a cross sectional view similar to Figs. 2 and 5, illustrating singly perforated plates imbedded in a non-metallic friction disk.

Referring in detail to the drawing, 1 indicates a friction disk which may be utilized in conjunction with a friction clutch, such as used in automobiles or the like. Disk 1 may be provided with teeth 2 at its outer periphery which may be adapted to engage with ribs or splines, not shown, carried on the driving plate and/or driven portion of the clutch, as shown and described in the United States patent to M. F. Judd, No. 1,536,588.

Friction disks of non-metallic material having integral teeth, are well known to the art. However, difficulty has been encountered in the use of this type friction disk in that the unsupported or unreenforced teeth constructed of the non-metallic material comprising the friction disk per se, tend to chip or otherwise disintegrate when subjected to relatively severe loads.

As a feature of my invention, one or more metal plates 3 may be embedded in the disk 1 in such a manner that, the outside faces of the disk comprise non-metallic material. In the event that more than one plate 3 is utilized, said plates may be embedded in spaced relationship within the non-metallic material, as shown best in Figs. 1 and 2. In either case, however, a portion of the plate or plates will project into the toothed portion of the disk, as shown best at 4 in Fig. 2.

Referring particularly to Figs. 3, 4, and 5, a modified form of reenforcing plate construction is shown and may comprise metal plate 5 of peripheral contour similar to plates 3. Plates 5 may be constructed of steel or other suitable metallic material and may be utilized in number and be of a gauge sufficient to properly reenforce the friction element. Plate 5 may be perforated, preferably by a relatively blunt perforating die whereby the metal is displaced transversely to the plane of the plate previous to its rupturing, the material being torn by the male portions of the die rather than being cleanly cut. Cooperating dies of similar character may simultaneously act upon the opposite face of the plate forming in said plate alternate spaced protuberances and perforations extending in opposite directions from the plane of the plate as shown best at 6 and 7 in Figs. 3 and 4.

Plates 5 may be utilized in a manner similar to plates 4; that is, a friction element 8 may be built up similar to friction element 1.

One or more plates 5 may be embedded in the disk 8, the outside faces of the disk comprising non-metallic material. The non-metallic material may be constructed, if desired, of impregnated unwoven asbestos which, being of a fibrous nature, intertwines with the protuberances 6 and forms a dense interlacing of asbestos fibre and metal which, when bound together by a suitable binder, increases, the strength of the friction disk and particularly the teeth thereof. By reference to Fig. 5 it can readily be seen that the non-metallic material extends through the protuberances forming an integral reenforced structure. In addition, in tearing the metal, as has been hereinbefore described, rather than cleanly cutting the same, rough edges are provided upon the protuberances which tend to assist the aforementioned interlocking action.

Referring particularly to Figs. 6, 7, and 8, a further modified form of reenforcing plate 9 is shown. Plate 9 may be constructed of metallic material and may be cut or otherwise formed similar to plates 3 and 5. Plate 9 may be operated upon by a die which may displace portions of the material transversely to the plane of the plate, the displaced material being ruptured. Unlike plate 5 plate 9 may be operated upon from only one face, thereby providing a plurality of adjacent protuberances 10 extending from but one face of the plate. One or more plates 9 may be embedded in a friction element 11 similar in construction to element 1, that is, element 11 may comprise a body of impregnated friction material reenforced by metal plates 9. Similar to elements 1 and 8, the outer faces of element 11 may comprise non-metallic friction material.

It can readily be seen that plates 9 when embedded in disk 11 permit interlocking engagement of the fibres comprising the non-metallic material and the protuberances 10 thereby efficiently reenforcing the element against both shear and impact and decreasing the wear upon the toothed portion thereof.

To form element 1, 8, or 11, a layer of unwoven asbestos saturated with a suitable binder may be positioned in a mold, not shown. A reenforcing plate 3, 5 or 9 may be positioned upon the non-metallic layer and a pack may be built up, comprising alternate layers of said saturated asbestos material and metal plates, to any desired thickness. A saturated asbestos face will form each of the outer surfaces and the inner portion may be of alternate construction. The pack may then be subjected to pressure in the mold and compressed to a desired predetermined thickness. After pressing, the pack may be cured by baking in ovens with or without pressure, depending upon the character of the saturant binder employed.

The invention may also be carried out by compressing alternate layers of metallic plate 3, 5 or 9 and water soaked unwoven asbestos; drying the pack thus formed and subsequently saturating the same with a liquid binder. The saturated pack may then be baked to obtain the desired hardness and toughness.

It can readily be seen that my invention extends the use of asbestos fibre friction disks with integral gear teeth to more severe applications for which hitherto the resistance of the gear teeth to shock has been insufficient. It also extends the economic gain of the use of one material for both gear teeth and friction facing into more extended fields of application. In constructing the teeth upon disk 1, 8 or 11, the same may be formed during the molding step, hereinbefore mentioned, or the disks may be formed as annular blanks and the teeth subsequently cut or otherwise formed upon the inner or outer periphery thereof.

I claim as my invention:

1. An annular friction disk comprising a body having relatively high frictional characteristics, constructed of compressed fibrous material, held together by a suitable binder and having splines integral with the body of the disk, said disk being provided with an endless metal reenforcing plate embedded in the body of the disk, said plate being also embedded in the splines and conforming in shape therewith, the outer faces of the disk comprising friction material whereby frictional engagement may take place at said outer faces.

2. An annular friction disk comprising a body having relatively high frictional characteristics, constructed of compressed fibrous material, held together by a suitable binder and having splines integral with the body of the disk, said disk being provided with an endless metal reenforcing plate, having a plurality of protuberances extending from a surface thereof embedded in the body of the disk, said plate being also embedded in the splines and conforming in shape therewith, the outer faces of the disk comprising friction material whereby frictional engagement may take place at said outer faces.

3. An annular friction disk comprising a body having relatively high frictional characteristics, constructed of compressed fibrous material, held together by a suitable binder and having splines integral with the body of the disk, said disk being provided with an endless metal reenforcing plate, having a plurality of protuberances extending from opposite surfaces thereof embedded in the body of the disk, said plate being also embedded in the splines and conforming in shape therewith, the outer faces of the disk comprising friction material whereby frictional engagement may take place at said outer faces.

FREDERICK C. STANLEY.